UNITED STATES PATENT OFFICE.

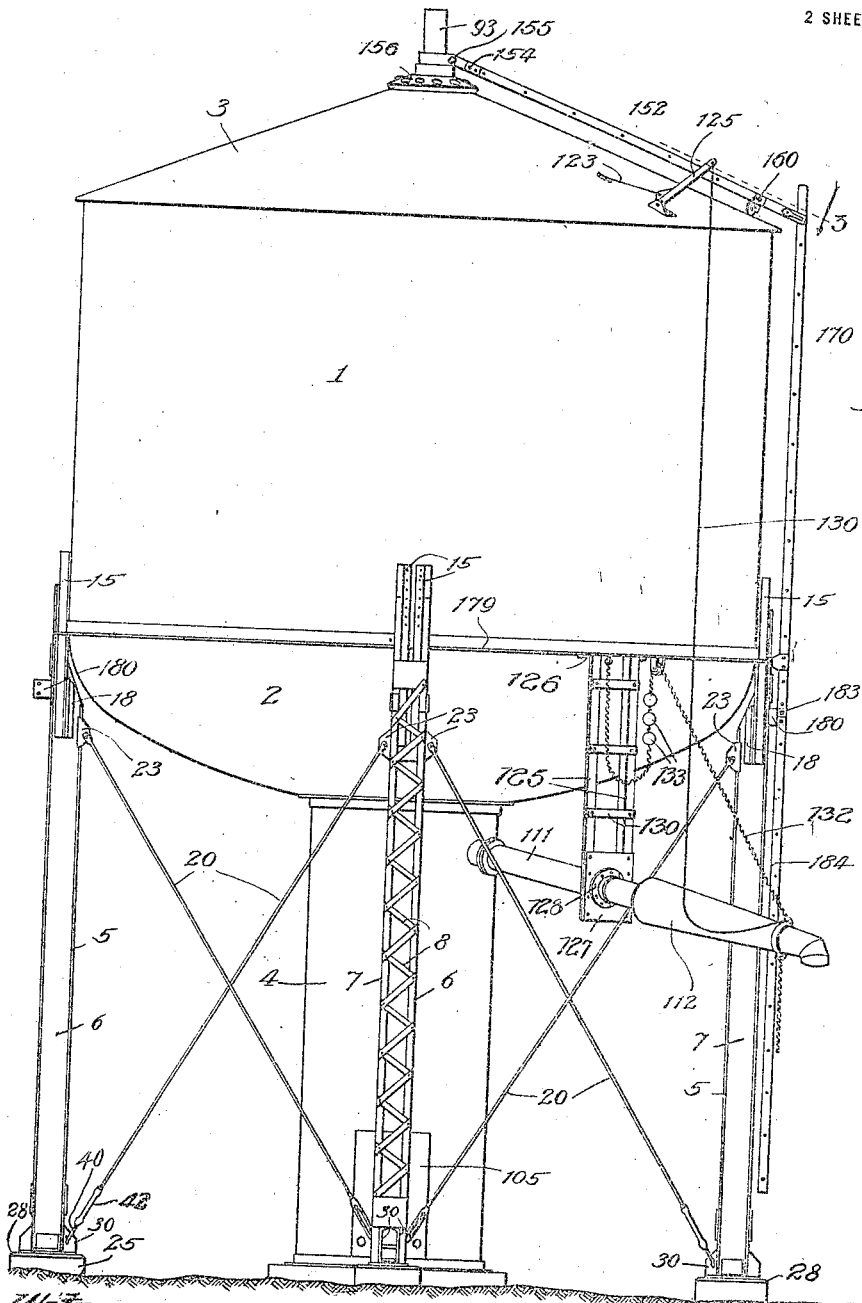

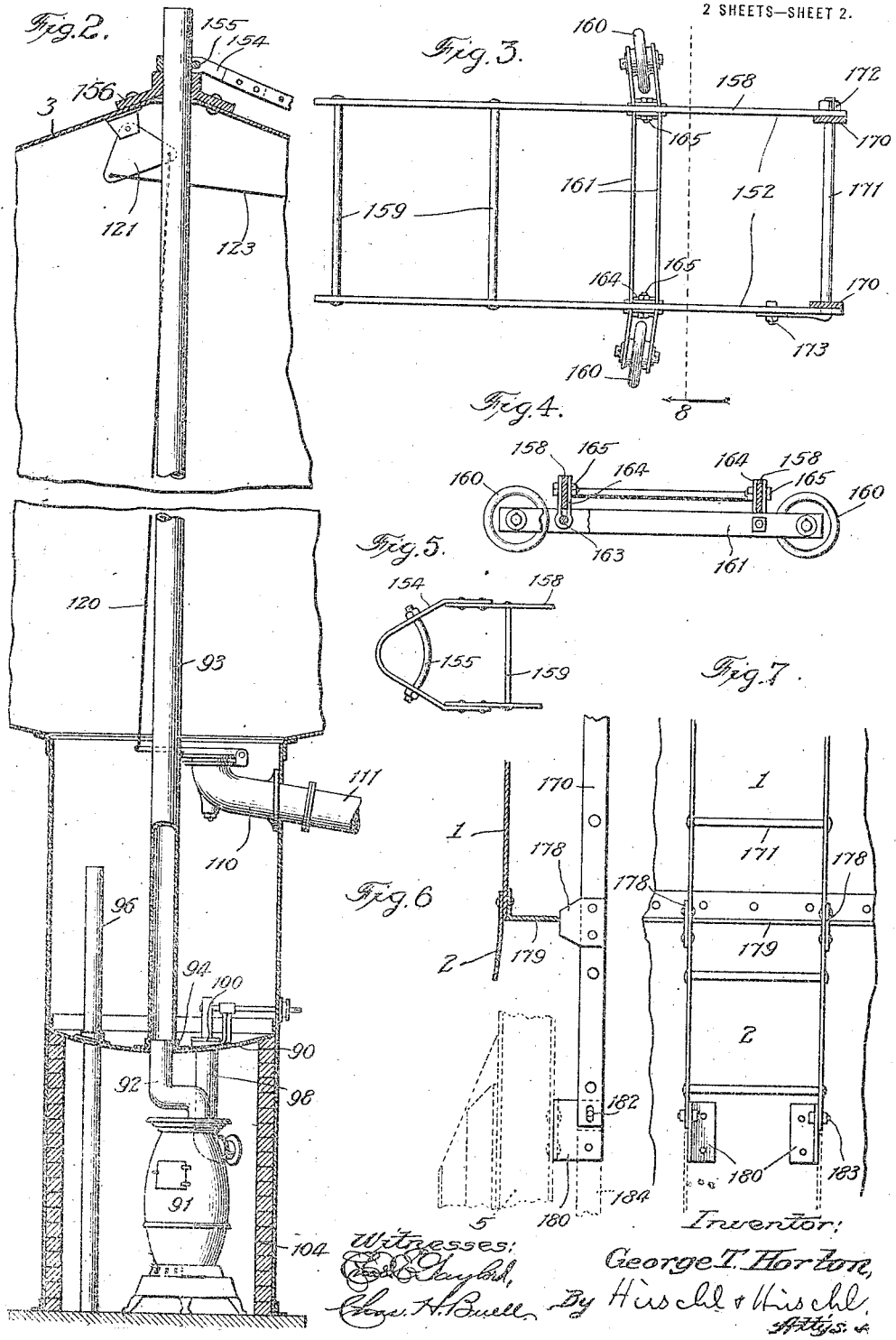

GEORGE T. HORTON, OF CHICAGO, ILLINOIS.

WATER-TANK.

1,184,347.

Specification of Letters Patent.   Patented May 23, 1916.

Application filed May 9, 1913. Serial No. 766,585.

*To all whom it may concern:*

Be it known that I, GEORGE T. HORTON, a citizen of the United States, residing at 10226 Longwood avenue, in Chicago, county of Cook, and State of Illinois, have invented new and useful Improvements in Water-Tanks, of which the following is a specification.

This invention relates to water tanks and more especially to tanks which are designed to hold a large quantity of water, such as railway tanks.

In my prior United States Letters Patent No. 857,626, issued June 25, 1907, there is shown and described a tank with a hemi-ellipsoid bottom which is supported on four posts and provided with a cylindric water leg or mud-drum in the center as an additional support for the bottom.
The present invention contemplates the construction of a tank similar in its essential parts to the tank shown in said prior patent but with the addition of certain improved features of construction which are hereinafter more fully described and set out in the accompanying drawings in which:

Figure 1 is a view of the complete tank in elevation. Fig. 2 is a partial view in vertical axial section. Fig. 3 is a section on the line 7 of Fig. 1 looking in the direction indicated by the arrow. Fig. 4 is a vertical section on the line 4 of Fig. 3. Fig. 5 is a top plan view showing the upper end of a ladder used in connection with the tank. Fig. 6 is an axial section at the outer lower part of the tank. Fig. 7 is a view showing the same portion in elevation.

As shown in said drawings, 1 indicates the body of the tank which is cylindrical in form and preferably constructed of sheet metal in the form of large rectangular plates cylindrically curved and riveted together at their meeting margins in the manner heretofore employed in constructing similar tanks. A bottom 2, hemi-ellipsoidal in shape, as described in my said prior patent, is similarly formed of curved plates, and a conical roof or cover 3 is also provided and is constructed in the same manner as the rest of the tank. The tank is supported on legs 5 comprising channel bars 6 and 7 having suitable lacings 8 connecting them together, and the shallow bottom 2 is additionally supported by a central cylindric water leg, or mud-drum 4, as explained in said prior patent. For the purpose of supporting the weight of the tank over the vertical center lines of the posts or legs 5, the upper end of each channel member is cut away along one edge, which is adjacent to the tank, and the remaining part of the channel is reinforced on both sides by angle plates 15, 15, which are continued upward above the tops of the channels and are riveted to the lowest course of plates in the tank body. Additional, shorter angle plates 18, 18 are riveted to both sides of each channel member and to the pairs of angle plates 15 so that the top part of each channel member is reinforced and braced by four angle plates riveted to it on both sides and to each other; two of such angle plates extending upward and carrying the weight of the tank which is riveted to them.

Two diagonal brace rods or tie rods 20, 20, extend from the top of each leg to the feet of two adjacent legs and these tie rods are secured at their upper ends to projections or ears in the form of triangular plates 23, which are riveted to the two channel members and are provided with openings into which the tie rods are engaged. In order to form a wide base for each supporting leg 5 and provide sufficient area for the distribution of its load over a concrete anchorage 25 which may be provided, a large horizontal base plate 28 is secured to the bottom of each leg and is connected thereto by means of horizontal channel members 30, 30 which are riveted to the lower ends of the channel members 6 and 7 and to the base plate. The base plates 28 are secured to the piers 25 by means of anchor bolts, not shown.

The ends of each channel member 30 extend beyond the vertical faces of the vertical channel members toward the center of the tank; and through such channel ends are cut vertical slots through which are inserted bent rods or bars 40, threaded at their ends. To the threaded ends of these bent rods are connected the threaded lower ends of the respective tie rods 20 by means of turn buckle nuts 42; each bent rod thereby serving to connect two of the tie rods to the foot of the tank leg and forming in addition a part of the turn buckles for tightening such rods.

The cylindric water leg or mud-drum 4 is provided with a false bottom 90 which is preferably spherically curved with its convex side downward, and beneath it is placed a heating stove 91 of any ordinary form for warming the water in the tank in cold weather. In the center of the false bottom 90 is cut a circular opening into which is inserted the stove pipe 92 of the stove, and the smoke and products of combustion are conducted upward through the entire height of the tank and through the roof by means of an iron or steel pipe 93 which aids in warming the water. The pipe 93 is joined to the false bottom 90 by means of a screwed joint 94 to prevent the leakage of water into the stove room below. An inlet pipe 96 for filling the tank extends up through the stove room and through a similar packed joint in the false bottom 90, and a blow-off pipe 98 is also led through the false bottom and controlled by a blow-off valve 100; the particular construction of which valve is not here shown but which may be made in the manner shown and described in my prior Patent No. 1,008,645 of Nov. 14, 1911. The interior of the cylindric stove room may be lined with fire bricks or other suitable heat insulating material 104, as indicated, and access is had thereinto by means of a door 105.

In the upper part of the water leg is placed an outlet valve 110 for supplying water through an outlet pipe 111 and hinged spout 112 to an engine, and such valve 110 is made with a long neck in order to bring its operative parts as near to the center of the tank and to the flue 93 as may be practicable. The valve is operated by a cable or chain 120 passing upward through the tank to a bell-crank lever 121 which is pivoted to the roof of the tank; and all of these parts are also arranged as close to the flue 93 as practicable in order to prevent ice from interfering with their operation. From the bell-crank lever 121 another cable 123 extends out through an opening in the roof of the tank where it is connected to another bell-crank lever 125 which is actuated by a hanging rope or cable 130 for operating the valve.

The outlet pipe 111 is shown as extending between two of the legs 5, and its outer end is supported from the ring 179 around the base of the tank as follows: 125, 125 indicate two vertical members, preferably of angle section, the upper ends of which are bent over and riveted to the horizontal flange of the angle member 179, as indicated at 126. At their lower ends they are connected by a large rectangular plate 127 having a circular opening through which extends the outlet pipe 111; the latter being provided with a flange or collar 128 which is riveted to the plate. Horizontal lacings 130 above the plate 127, together with the vertical members 125, constitute in effect a ladder providing access to the outer end of the outlet pipe and the hinged spout from above; and the upper part of the ladder 130 may be easily reached by means of the revolving ladder 170. The hinged spout 112 is counterbalanced by means of a chain 132 and counter weights 133.

The smoke pipe 93 projects through an opening in the center of the conical roof 3 and serves as a support for a pivoted ladder 152 which is secured to it by means of a yoke 154 (Fig. 5) partially encircling it, and a curved bolt 155 to prevent eccentric displacement. As it is difficult to cut an exactly circular opening in the center of the roof to fit around and support the pipe 93, such opening is made somewhat larger than the diameter of the pipe and is covered by a conical ring or collar 156 which is riveted to the roof plates, and through which the pipe extends. The center part of this collar is made in the form of a sleeve embracing the pipe and serving as a thrust bearing for the vertical component of the weight of the ladder 152. The ladder is made in the ordinary form with side bars 158 and rungs 159, and near its foot are placed rollers or wheels 160 which rest upon the curved roof 3, so that the ladder may be revolved about its pivot at the center of the roof. The two wheels 160 are mounted between the ends of horizontal and parallel bars 161 which are connected to each other by bolts 163, and these bolts are surrounded by bent plates or clips 164 which space them apart and embrace the two sides of the side bars 158 of the ladder to which they are bolted by means of bolts 165. A vertical ladder 170 depends from the outer end of the pivoted ladder 152, being hinged thereto by means of its top rung 171 which is also the bottom rung of the inclined ladder 152. The said top rung or hinge bolt 171 extends through openings in the side bars of the two ladders and is secured by a nut 172 on one end and by bending its other end at right angles, flattening it, and bolting it to a side bar of the upper ladder as indicated at 173 in order to prevent it from rotating and working loose by the swinging of the lower ladder. The latter is provided at its lower end with shoes 178 in the form of small plates which rest against curved angle members 179 forming an interrupted ring around the tank, in order to space the ladder away from it and allow it to be revolved about the tank without striking the legs 5. From one of the legs 5 are extended two angle plates 180, 180 by means of which the ladder may be fixed against rotation by swinging its lower end outward to engage the plates 180 between its two side bars as shown in Fig. 7; and in addition it may be bolted thereto as also shown if desired, its two side bars being provided with openings 182 for the insertion of bolts 183.

The two plates 180 also serve to support the upper end of a fixed ladder 184 which is secured to one of the legs 5.

I claim as my invention:

1. The combination with an elevated water tank having its bottom joined to a central member of less diameter than the diameter of the tank, such central member connecting with the interior of said tank and being adapted to contain water, of a false bottom in said member, a heating device below such false bottom, and a flue joining said false bottom and extending upward through the tank.

2. The combination with an elevated water tank having its bottom joined to a central supporting leg, the upper part of such supporting leg connecting with the interior of the tank and being adapted to contain water, of a false bottom in said supporting leg, a heating device in said leg below such false bottom and a flue joining said false bottom and extending upward through the tank.

3. The combination with an elevated water tank having its bottom joined to a central member of less diameter than the diameter of the tank, such central member connecting with the interior of the tank and being adapted to contain water, of a false bottom in said central member, a heating device in said central member below the false bottom, a flue joining said false bottom and extending upward through the tank, and an outlet valve above said false bottom and closely adjacent to said flue.

4. The combination with an elevated water tank having its bottom joined to a central supporting leg the upper part of said supporting leg connecting with the interior of the tank and being adapted to contain water, of a false bottom in said supporting leg, a heating device in said leg below such false bottom, a flue joining said false bottom and extending upward through the tank and an outlet valve above such false bottom and closely adjacent to said flue.

5. The combination with a tank having a conical roof, a central water leg supporting its bottom, a false bottom in such water leg, a heating device below such false bottom, and a flue joining such false bottom and extending upward through the tank and above its roof, of an inclined ladder with its upper end pivoted to said flue and having wheels resting on said roof.

In witness whereof, I have hereunto subscribed my name in the presence of two witnesses this fifth day of May, 1913.

GEORGE T. HORTON.

Witnesses:
  HORACE B. HORTON,
  FRANCIS E. LEE.